(12) United States Patent
Venter et al.

(10) Patent No.: US 11,156,267 B2
(45) Date of Patent: Oct. 26, 2021

(54) PLANETARY GEAR

(71) Applicant: Rolls-Royce Deutschland Ltd & Co KG, Blankenfelde-Mahlow (DE)

(72) Inventors: Gideon Daniel Venter, Berlin (DE); Jan Schwarze, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 16/130,313

(22) Filed: Sep. 13, 2018

(65) Prior Publication Data
US 2019/0085943 A1    Mar. 21, 2019

(30) Foreign Application Priority Data

Sep. 15, 2017 (DE) ...................... 10 2017 008 674.5

(51) Int. Cl.
*F16H 1/48* (2006.01)
*F16H 57/08* (2006.01)
(Continued)

(52) U.S. Cl.
CPC ................. *F16H 1/48* (2013.01); *F02C 7/36* (2013.01); *F16H 57/08* (2013.01); *F01D 15/12* (2013.01);
(Continued)

(58) Field of Classification Search
CPC .. F16H 1/48; F16H 57/08; F16H 2057/02039; F16H 2057/0081;
(Continued)

(56) References Cited

U.S. PATENT DOCUMENTS 3,454,394 A * 7/1969 Makoto .................. F16H 55/08
74/462
3,776,067 A   12/1973 DeBruyne et al.
(Continued)

FOREIGN PATENT DOCUMENTS

| DE | 102008045848 A1 | 3/2010 |
| EP | 0054280 A1 | 6/1982 |
| EP | 3002434 A1 | 4/2016 |

OTHER PUBLICATIONS

European Search Report dated Feb. 13, 2019 for counterpart European Patent Application No. 18191299.9.
(Continued)

*Primary Examiner* — Jeffrey A Shapiro
(74) *Attorney, Agent, or Firm* — Shuttleworth & Ingersoll, PLC; Timothy Klima (57) ABSTRACT

A planetary gear with a sun wheel, a hollow wheel and a planetary carrier on which a planetary wheel is rotatably mounted. In the axial direction on a first side of the planetary carrier, the sun wheel and hollow wheel include connection areas for coupling the sun wheel and hollow wheel to rotatable or torque-proof areas of an engine. The planetary carrier has a connection area for attaching to rotatable or torque-proof areas of the engine on its opposite second side. The structural component stiffnesses of the sun wheel, planetary carrier, the hollow wheel and the planetary wheel are adjusted to each other such that, during operation they have twistings in the axial direction of the planetary gear that respectively qualitatively correspond to each other between the connection areas and side areas facing away from the connection areas due to the respectively applied torques.

19 Claims, 3 Drawing Sheets

(51) Int. Cl.
  *F02C 7/36* (2006.01)
  *F16H 57/02* (2012.01)
  *F01D 15/12* (2006.01)
  *F16H 57/00* (2012.01)
  *F16H 1/28* (2006.01)

(52) U.S. Cl.
  CPC .............................. *F05D 2220/32* (2013.01);
    *F05D 2260/40311* (2013.01); *F16H 1/2809*
    (2013.01); *F16H 2057/0081* (2013.01); *F16H
    2057/02039* (2013.01)

(58) Field of Classification Search
  CPC .... F16H 55/08; F16H 55/0886; F16H 1/2818;
    F16H 1/2827; F16H 1/2809; F16H
    2260/40311; F16H 2220/32; F05D
    2260/40311; F05D 2220/32; F02C 7/36;
    B23F 9/084; F01D 15/12
  See application file for complete search history.

(56) References Cited

U.S. PATENT DOCUMENTS

| | | | | |
|---|---|---|---|---|
| 4,651,588 | A * | 3/1987 | Rouverol | F16H 55/0806 74/462 |
| 5,472,383 | A * | 12/1995 | McKibbin | F16H 57/0482 184/6.12 |
| 6,223,616 | B1 | 5/2001 | Sheridan | |
| 2003/0114267 | A1* | 6/2003 | Poulin | F02C 7/36 475/331 |
| 2004/0156669 | A1* | 8/2004 | Lejeune | F01D 21/045 403/2 |
| 2005/0278952 | A1* | 12/2005 | Ooka | B21K 1/30 29/893 |
| 2011/0277573 | A1* | 11/2011 | Duong | F16H 1/26 74/409 |
| 2012/0277056 | A1* | 11/2012 | Erno | F03D 15/10 475/331 |
| 2013/0023378 | A1* | 1/2013 | McCune | F16H 57/082 475/344 |
| 2013/0091970 | A1* | 4/2013 | O-oka | F16H 55/08 74/458 |
| 2014/0155219 | A1* | 6/2014 | McCune | F01D 15/12 475/331 |
| 2016/0076393 | A1* | 3/2016 | Sheridan | F16H 1/2827 416/170 R |
| 2016/0090988 | A1* | 3/2016 | Venter | F02K 3/06 416/171 |
| 2016/0097331 | A1* | 4/2016 | Venter | F01D 15/12 415/122.1 |
| 2016/0298485 | A1 | 10/2016 | Sheridan et al. | |
| 2016/0326964 | A1* | 11/2016 | Curlier | F02K 3/072 |

OTHER PUBLICATIONS

German Search Report dated Jul. 2, 2018 for counterpart German Patent Application No. DE 10 2017 008 674.5.
Niemann et al.; Machine Elements. Transmission in Gneral, Gear Transmission; 2nd Edition, Berlin; Springer, 1983, p. 114; ISBN 3-540-11149-2.

* cited by examiner

PLANETARY GEAR

This application claims priority to German Patent Application DE102017008674.5 filed Sep. 15, 2017, the entirety of which is incorporated by reference herein.

The invention relates to a planetary gear arrangement according to the kind as is disclosed herein.

Simple planetary gears as they are known from practice usually comprise a sun wheel, a hollow wheel and a planetary carrier on which at least one planetary wheel is mounted in a rotatable manner. The planetary wheel is in mesh with the hollow wheel as well as with the sun wheel. For being coupled to rotatable or torque-proof areas of a jet engine, the shafts of the planetary gear or the sun wheel, the hollow wheel as well as the planetary carriers are embodied with connection areas.

During operation of a jet engine, the torques applied to such a planetary gear can cause twistings or torsions of the sun wheel, of the hollow wheel, of the planetary wheel and of the planetary carrier in the circumferential direction. These deformations occur especially if the connection areas of the sun wheel, of the hollow wheel a well as of the planetary carrier extend in the axial direction of the planetary gear between the these and the coupling areas between the shafts of a planetary gear and the rotatable or torque-proof areas of a jet engine. Here, the torsions or twistings increase in the axial direction of the planetary gear respectively between the connection areas of the sun wheel, of the hollow wheel and of the planetary carrier and the respectively opposite free side of these structural components depending on the respectively present structural component stiffness with a respectively defined progression.

The twistings of the different structural components of a planetary gear in turn cause an orientation of the tooth flanks of the meshing tooth areas of the sun wheel and of the planetary wheel as well as of the planetary wheel and of the hollow wheel to be twisted or pivoted by the loads applied during operation, starting from an unloaded operational state of the planetary gear in the direction of an operational range of the jet engine in which high loads are applied at the planetary gear. This results in the contact surfaces between the meshing teeth of the previously mentioned toothing areas being reduced to an undesired degree during operation.

Here, there is the possibility that inadmissibly high crimping or loading occurs in the area of the contact surfaces of the toothing areas, which compromises the functionality of the planetary gear as irreversible and permanent damage to the tooth flanks may occur. To limit the twistings or torsions in the area of the sun wheel, of the hollow wheel, of the planetary carrier and of the planetary wheel to the desired extent, they have to be embodied with a correspondingly high structural component stiffness. However, this approach causes large structural component dimensions that result in a high structural component weight of a planetary gear, which, however, interferes with the design criteria for aircraft engines.

Further there is also the possibility of providing a profile correction in the area of the tooth meshings through the respective tooth width, wherein for this purpose the tooth flanks again have to be correspondingly designed to be larger and wider. However, this also increases the structural component dimensions of a planetary gear and in turn also disadvantageously raises the structural component weight of a planetary gear.

Thus, the present invention is based on the objective of providing a planetary gear that is advantageous with respect to the installation space and characterized by a low structural component weight, and in addition is characterized by a long service life.

This objective is achieved by a planetary gear with features as disclosed herein.

The planetary gear according to the invention comprises at least one sun wheel, at least one hollow wheel and one planetary carrier. On the planetary carrier, at least one planetary wheel is mounted in a rotatable manner. The planetary wheel is in mesh with the hollow wheel as well as with the sun wheel. In the axial direction on a first side of the planetary carrier, the sun wheel and the hollow wheel are respectively embodied with connection areas for coupling the sun wheel and the hollow wheel to rotatable or torque-proof areas of a jet engine, while the planetary carrier has a connection area for attaching the planetary carrier to rotatable or torque-proof areas of a jet engine on its opposite second side.

According to the invention, the structural component stiffnesses of the sun wheel, of the planetary carrier, of the hollow wheel and of the planetary wheel are adjusted to each other in such a manner that, during operation within an operational range of the jet engine, the sun wheel, the planetary carrier, the hollow wheel and the planetary wheel have twistings that respectively qualitatively correspond to each other in the axial direction of the planetary gear between the connection areas and the side areas that are facing away from the connection areas due to the respectively applied torques, starting from a side of the planetary carrier in the direction of the opposite side of the planetary carrier.

In this way, it is achieved in a simple manner that the tooth areas of the sun wheel, of the planetary wheel and of the hollow wheel are respectively twisted only to a small extent with respect to each other, and the contact surfaces between interacting tooth flanks of the tooth areas of the sun wheel and of the planetary wheel as well as between the planetary wheel and the hollow wheel are embodied to a degree that maintains the functionality of the planetary gear. In this way, the sun wheel, the hollow wheel, the planetary carrier and the planetary wheel are advantageous with respect to the installation space and can also be embodied with a lower installation space as compared to solutions as they are known from practice.

Through the embodiment of the planetary gear according to the invention, a deviation or oblique position in the area of the tooth meshings between the hollow wheel and the planetary wheel as well as between the planetary wheel and the sun wheel is small, respectively. In this manner, undesirable point loads in the abutment areas of the tooth flanks of these toothing areas are reduced in a simple manner. Although in general point loads in toothing areas can also be reduced by means of toothings that are respectively embodied in a crowned manner, crowned teeth entail a high manufacturing effort and require correspondingly large tooth widths.

In an advantageous exemplary embodiment of the planetary gear according to the invention, the sun wheel, the hollow wheel and the planetary wheel are respectively embodied with two tooth areas that are arranged at a distance from each other in the axial direction.

Moreover, the sun wheel, the hollow wheel and the planetary wheel have at least two areas between the tooth areas that are arranged at a distance from each other in the circumferential direction, with their wall thicknesses differing from the further circumferential areas between the tooth areas, or from the circumferential areas that are respectively located in between them.

Here, there is the possibility of the areas for example being embodied with stiffening ribs, and their wall thicknesses being larger than the wall thicknesses of the circumferential areas between the tooth areas. Moreover, there is also the possibility of the areas being embodied with smaller wall thicknesses than the circumferential areas between the tooth areas, preferably with recesses, such as slits, bores or the like. What is generally aimed at by this measure is to influence or adjust the structural component stiffness in a defined manner.

Based on the explained areas that are embodied to the previously described extent, the structural component stiffnesses of the sun wheel, of the hollow wheel and of the planetary wheel can be set in such a manner that they are adjusted to the respectively present application case or operational case to the desired extent. By means of this defined structural component stiffness, a defined twisting of the sun wheel, of the hollow wheel and of the planetary wheel can respectively be achieved to a defined degree during operation within the operational range of a jet engine, and a maximally large contact surface can be obtained in a simple manner in the toothing area between the sun wheel and the planetary wheel as well as between the hollow wheel and the planetary wheel. If the tooth areas of the sun wheel, of the hollow wheel and of the planetary wheel respectively have helical gearings, a respectively applied torque can be evenly transmitted with a better running smoothness as well as with a lower noise generation as compared to a straight toothing.

If the angle which the helical gearings of the tooth areas of the sun wheel, of the hollow wheel and of the planetary wheel respectively enclose with the rotational axes are identical, the axial forces to be respectively supported as resulting from the tooth meshings are low.

If the angle which the helical gearings of the tooth areas of the sun wheel, of the hollow wheel and of the planetary wheel respectively enclose with the rotational axes of these structural components differ from each other, twistings of the tooth flanks between the tooth areas of the sun wheel and of the planetary wheel as well as between the hollow wheel and the planetary wheel can be compensated by a corresponding definition of the angle values, and the contact surfaces between the tooth meshings can again be set to the desired extent.

If the angle values of the angles of the helical gearings of the tooth areas of the sun wheel, of the hollow wheel and of the planetary wheel are respectively increased by a defined offset value in the rotational direction of the sun wheel, of the hollow wheel and of the planetary wheel for compensating the twisting of the planetary carrier in the circumferential direction, the contact surfaces between the tooth meshings between the sun wheel and the planetary wheel as well as between the planetary wheel and the hollow wheel are sized as required in a simple manner even if high loads are applied.

If the connection areas of the sun wheel, of the hollow wheel and/or of the planetary carrier are embodied with at least two areas that are arranged at a distance from each other in the circumferential direction, with their wall thicknesses respectively differing from the circumferential areas that are located in between them, the structural component stiffnesses can in turn be adjusted to the desired extent in a constructionally simple manner.

In a further advantageous exemplary embodiment of the planetary gear according to the invention, the teeth of the sun wheel, of the hollow wheel and of the planetary wheel are embodied in a crowned manner. In this manner, any torsion of the teeth between the sun wheel and the planetary wheel as well as between the planetary wheel and the hollow wheel resulting from the twisting of the planetary carrier, of the sun wheel, of the hollow wheel and of the planetary wheel can be compensated in a simple manner.

In a further advantageous exemplary embodiment of the planetary gear according to the invention, the hollow wheel is embodied in two parts. Here, it is provided that each of the hollow wheel parts comprises one of the tooth areas of the hollow wheel. Further, the structural component stiffnesses of the hollow wheel parts are designed in such a manner that any twisting of the hollow wheel parts respectively causes a defined oblique position of the teeth of the tooth areas in the circumferential direction during operation within the defined operational range. In this way, it can in turn be ensured with small constructive effort that the contact surfaces do not fall below a value in which irreversible damage to the planetary gear is avoided even if high loads are applied to the planetary gear between the tooth meshings of the sun wheel and of the planetary wheel as well as of the planetary wheel and of the hollow wheel.

If any twisting directed counter to the twisting of the planetary carrier that occurs during operation within the operational range is applied to the unloaded planetary carrier through the mounted planetary wheel in the axial direction, the torsions of the tooth flanks or of the tooth areas of these structural elements of the planetary gear as they result from the twisting of the sun wheel, of the hollow wheel, of the planetary carrier and of the planetary wheel can again be reduced in a simple manner.

The features specified in the patent claims as well as the features specified in the following exemplary embodiments of the planetary gear according to the invention are suitable to further develop the subject matter according to the invention respectively on their own or in any desired combination with each other.

Further advantages and advantageous embodiments of the invention follow from the patent claims and from the exemplary embodiments that are described in principle in the following by referring to the drawing, wherein, with a view to clarity, the same reference signs are used in the description of the exemplary embodiments for structural components having the same structure and functionality in the description of the different exemplary embodiments.

Herein.

Figure 1:
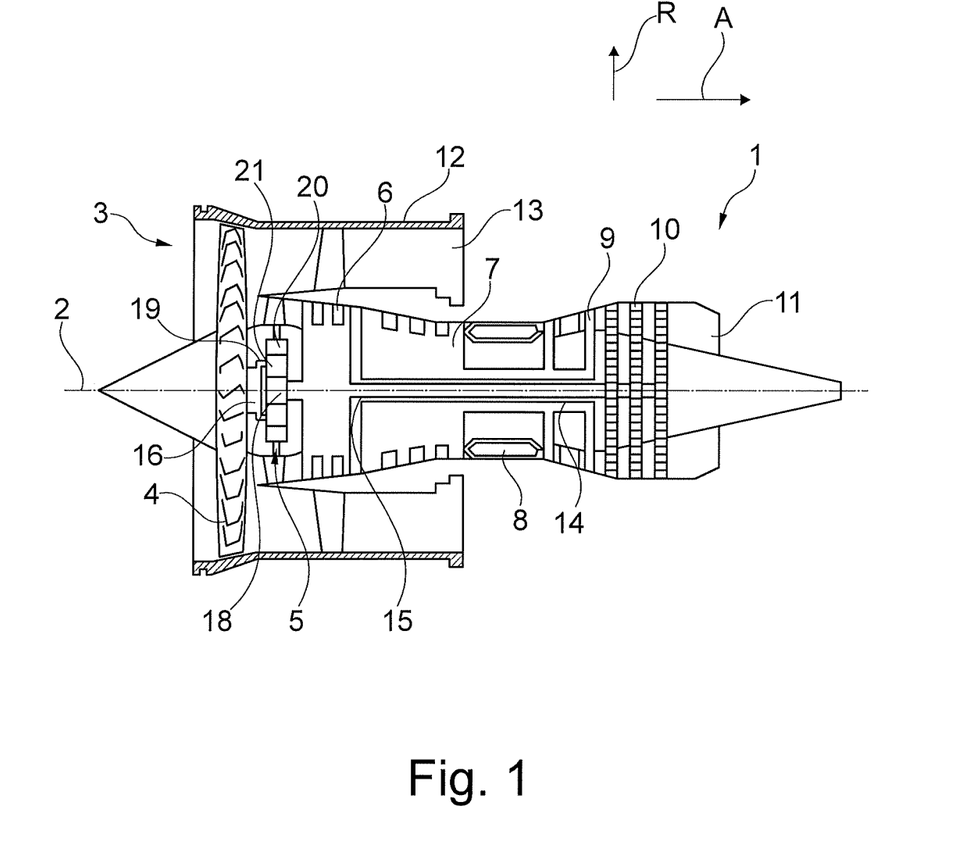
FIG. 1 shows a simplified sectional view of a jet engine, wherein a fan is in operative connection with a low-pressure turbine via a planetary gear.

In FIG. 1 a turbomachine is shown that is embodied as a jet engine 1 of an aircraft, having a planetary gear 5 that will be explained in more detail in the following. The jet engine 1 is a turbomachine with which the planetary gear 5 can advantageously be combined. As will become clear from the following description, the planetary gear device 5 can also be used with differently embodied turbomachines.

The jet engine 1 has a main rotational axis 2. Further, the jet engine 1 comprises, in the axial flow direction A, an air intake 3, a fan 4, a planetary gear device 5, a low-pressure compressor 6, a high-pressure compressor 7, a combustion appliance 8, a high-pressure turbine 9, a low-pressure turbine 10 and a discharge nozzle 11. An engine nacelle 12 surrounds the jet engine 1 and delimits the air intake 3.

The jet engine 1 operates in a conventional manner, wherein air entering the intake 3 is accelerated by the fan 4 to create two air flows. A first air flow flows into the intermediate-pressure compressor 6 and a second air flow is passed through a subsidiary flow channel 13 or bypass channel to provide a drive thrust. The low-pressure compressor 6 compresses the air flow that is supplied to it, before the air is further compressed in the area of the high-pressure compressor 7.

The compressed air that is discharged from the high-pressure compressor 7 is introduced into the combustion appliance 8, where a mixing with fuel occurs, and the fuel-air mixture is combusted. The resulting hot combustion products expand and thereby drive the high-pressure turbine 9 and the low-pressure turbine 10 before they are discharged via the discharge nozzle 11 to provide additional drive thrust. The high-pressure turbine 9 and the low-pressure turbine 10 drive the high-pressure compressor 7 and the low-pressure compressor 6, respectively, by means of a high-pressure shaft 14 and a low-pressure shaft 15, respectively. The low-pressure shaft 15 that couples the low-pressure turbine 10 with the low-pressure compressor 6 is coupled to the fan 4 via the planetary gear device 5 which represents a reduction gear. A drive torque of the stationary gear ratio of the planetary gear device 5 that is supplied to the planetary gear device 5 via the low-pressure shaft 15 is correspondingly increased and supplied to a fan shaft 16. If the fan 4 is driven by the low-pressure turbine 10, the rotational speed of the low-pressure shaft 15 is reduced corresponding to the gear ratio of the planetary gear device 5, and the fan shaft 16 as well as the fan 4 are driven with this reduced rotational speed and with a torque that is increased with respect to the torque applied to the low-pressure shaft 15.

In the embodiment of the planetary gear 5 shown in FIG. 1, a sun wheel 18 of the planetary gear device 5 is connected in a torque-proof manner to the low-pressure shaft 15, and a planetary carrier 19 of the planetary gear device 5 is connected in a torque-proof manner to the fan shaft 16. A hollow wheel 20 of the planetary gear device 5 is fixedly attached to the housing. Thus, a so-called epicyclic embodiment is available.

Figure 2:
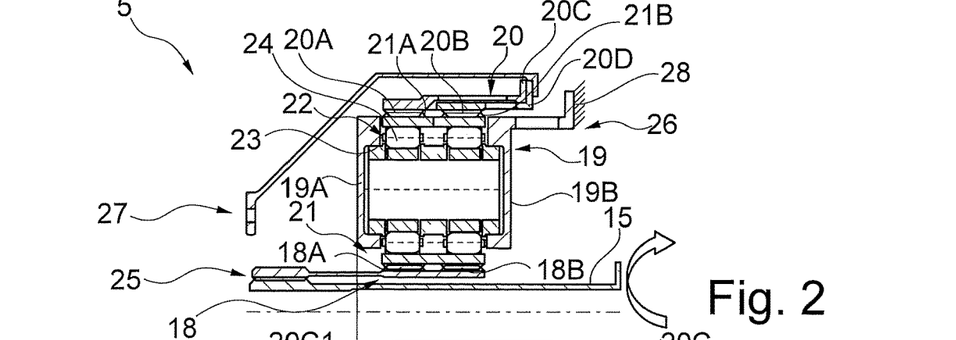
FIG. 2 shows a strongly schematized longitudinal section of an upper area of a first exemplary embodiment of a planetary gear, with its planetary carrier being firmly attached at the housing side.

As shown in FIG. 2, the planetary wheel 21 is mounted in a rotatable manner via a roller bearing in the planetary carrier 19, which in the present case is embodied in two parts. Here, the roller bearing 22 comprises an inner bearing ring 23 via which the roller bearing 2 is operatively connected in axially outer areas to planetary carrier areas 19A, 19B that are connected to each other. Roller bodies 24 of the roller bearings 22 are arranged between the inner bearing ring 23 and the planetary wheel 21.

Depending on the respectively present application case, there is also the possibility of the planetary wheel 21 being mounted in a rotatable manner at the planetary carrier 19 of the planetary gear 5 via a sliding bearing.

The sun wheel 18, the hollow wheel 20 and the planetary wheel 21 are respectively embodied with a double helical gearing, wherein the tooth areas 18A, 18B of the sun wheel 18, the tooth areas 20A, 20B of the hollow wheel 20, and the tooth areas 21A, 21B of the planetary wheel 21 are arranged at a distance from each other in the axial direction A of the planetary gear 5.

The hollow wheel 20 is embodied in two pieces. A first part 20C of the hollow wheel 20 comprises the first tooth area 20A and a second hollow wheel part 20D of the hollow wheel 20 comprises the second tooth area 20B. The two hollow wheel parts 20C and 20D are embodied with multiple areas 20C1, 20D1 that are arranged at a distance from each other in the circumferential direction, with their wall thickness respectively differing from the wall thicknesses of the rest of the circumferential areas of the hollow wheel parts 20C and 20D. Here, the wall thickness of the areas 20C1 and 20D1 is zero in the exemplary embodiment of the planetary gear 5 shown in FIG. 2, with the hollow wheel parts 20C and 20D having multiple recesses in the circumferential direction, so that a desired structural component stiffness can be set.

In contrast to that, it can for example also be provided that the areas 20C1, 20D1 are embodied with stiffening ribs and in that case have a larger wall thickness than the rest of the circumferential areas of the hollow wheel parts 20C and 20D, so that the structural component stiffness can be defined or to maintained to the desired extent.

The sun wheel 18, the planetary carrier 19 and the hollow wheel 20 are respectively embodied with connection areas 25, 26, 27 to the extent as it is shown in FIG. 2. Here, the planetary carrier 19 is connected in a torque-proof manner to a housing part 28 of the jet engine 1 via the connection area 26 on that side of the planetary carrier area 19B that is facing away from the planetary wheel 21. The hollow wheel 20 is coupled in a torque-proof manner to the fan shaft 16 via the connection area 27 on the side of the planetary carrier area 19A that is facing away from the planetary wheel 21. In turn, the sun wheel 18 is in operative connection with the low-pressure shaft 15 via the connection area 25 on that side of the planetary carrier area 19B that is facing away from the planetary wheel 21.

Figure 3:
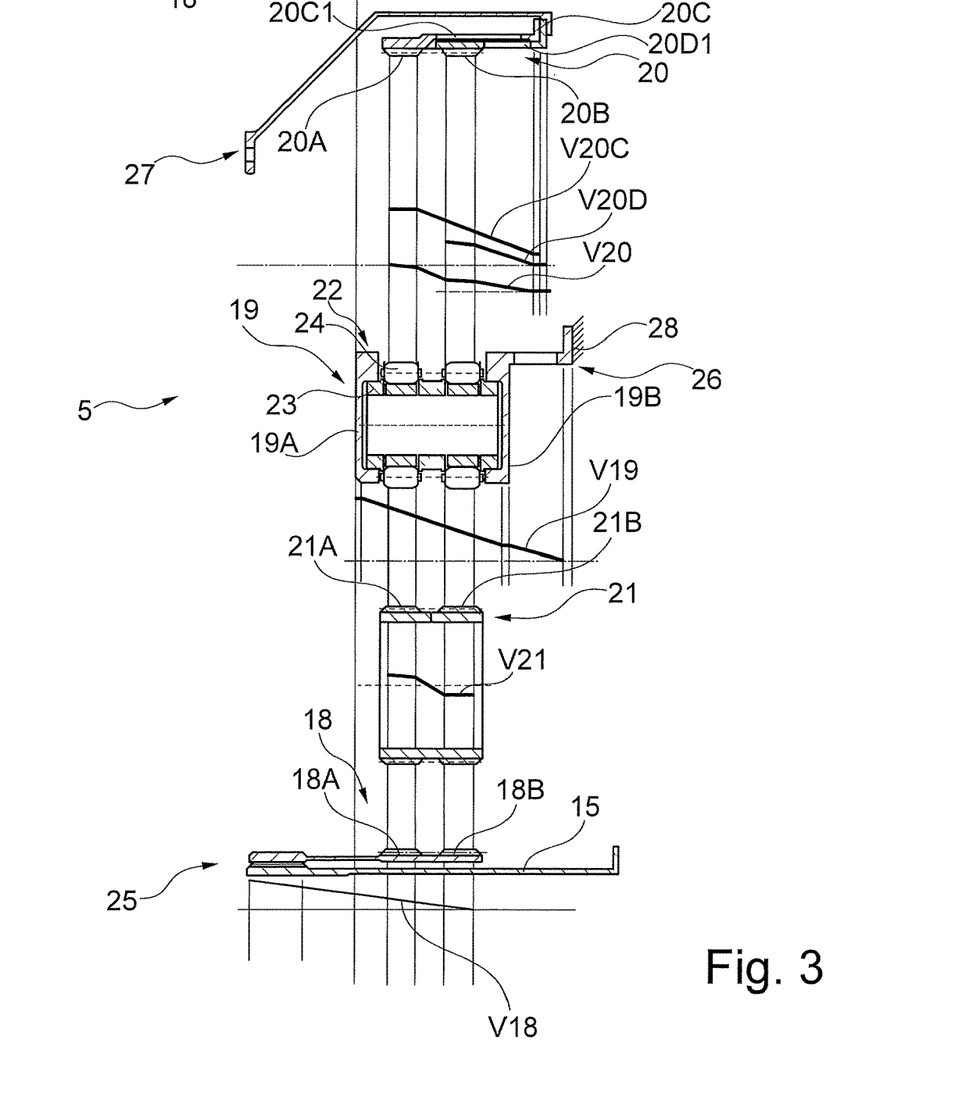
FIG. 3 shows an exploded rendering of the planetary gear according to FIG. 2 as well as multiple progressions of the twistings of a sun wheel, of a planetary wheel, of the planetary carrier and of a hollow wheel of the planetary gear in the axial direction as they occur during operation in a defined operating point of a jet engine.

The sun wheel 18, the planetary carrier 19, the hollow wheel 20 and the planetary wheel 21 are respectively embodied with a defined structural component stiffness. During operation of the jet engine 1, the progressions of the twistings of the sun wheel 18, of the planetary carrier 19, of the hollow wheel 20 and of the planetary wheel 21, as shown in FIG. 3, starting from the planetary carrier area 19B in the direction of the planetary carrier area 19A, occur depending on a defined operating point of the jet engine in the axial direction A of the planetary gear 5. At that, the progression V20C corresponds to a twisting or torsion of the hollow wheel part 20C. The progression V20D indicates the twisting of the hollow wheel part 20D during operation of the jet engine 1. The effective twisting of the hollow wheel 20 resulting from the two progressions V20C and V20D corresponds to the progression V20.

The progression V19 shown in FIG. 3 in turn corresponds to the twisting of the planetary carrier 19, while the progression V21 indicates the twisting of the planetary wheel 21. In addition, the progression V18 corresponds to the twisting in the area of the sun wheel 18.

The structural component stiffnesses of the sun wheel 18, of the planetary carrier 19, of the hollow wheel 20 and of the planetary wheel 21 are adjusted to each other. At that, the adjustment is chosen in such a manner that, during operation of the jet engine 1 and within a defined operational range of the jet engine 1, the sun wheel 18, the planetary carrier 19, the hollow wheel 20 and the planetary wheel 21 have twistings that qualitatively correspond to each other in the axial direction A of the planetary gear 5 between the connection areas 25, 26 and 27 and their side areas that are respectively facing away from the connection areas 25, 26 and 27.

In this manner, it is achieved that due to the twistings of the sun wheel 18, of the hollow wheel 20, of the planetary carrier 19 and of the planetary wheel 21 each of the resulting torsions of the tooth flanks of the tooth areas 18A, 18B of the sun wheel with respect to the tooth areas 21A, 21B of the planetary wheel 21 and of the tooth areas of the planetary wheel 21A, 21B of the planetary wheel 21 with respect to the tooth areas 20A and 20B of the hollow wheel 20 are small. This in turn results in the contact surfaces between the respectively meshing tooth flanks of these tooth areas being sufficiently large, and in inadmissibly strong crimping or a respectively inadmissibly high Hertzian stress in the area of the tooth flanks being avoided.

Figure 4:
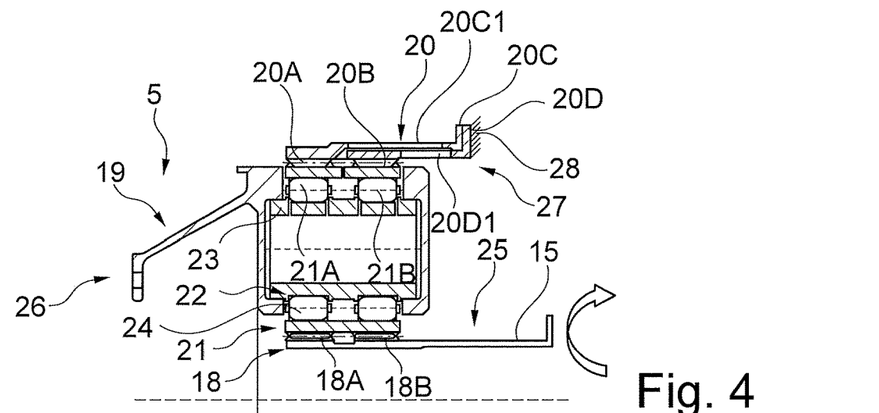
FIG. 4 shows a rendering of a second exemplary embodiment of the planetary gear, corresponding to FIG. 1, in which the hollow wheel is firmly attached at the housing side.

FIG. 4 shows a rendering of a further exemplary embodiment of the planetary gear 5 corresponding to FIG. 2, in which the hollow wheel 20 is connected to the housing 28 in a torque-proof manner, while the planetary carrier 19 is in operative connection with the fan shaft 16 on the opposite side of the planetary carrier 19, and is thus embodied in a rotatable manner. On the side of the planetary carrier 19, the sun wheel 18 is in turn connected in a torque-proof manner to the low-pressure shaft 15 on which the hollow wheel 20 is attached at the housing 28 in a torque-proof manner.

FIG. 5 again shows a rendering of the planetary gear 5 according to FIG. 4, corresponding to FIG. 3, and the progressions V18, V19, V20, V20C, V20D and V21 of the twistings that occur in the area of the sun wheel 18, of the planetary carrier 19, of the hollow wheel 20 and of the planetary wheel 21 during operation of the jet engine in a defined operating point of the jet engine 1. Due to the structural component stiffnesses of these structural elements of the planetary gear 5 being again adjusted to each other, the twistings in the area of the sun wheel 18, of the planetary carrier 19, of the hollow wheel 20 and of the planetary wheel 21 all increase starting from the planetary carrier area 19A in the direction of the planetary carrier area 19B, thus corresponding to each other qualitatively.

Figure 5:
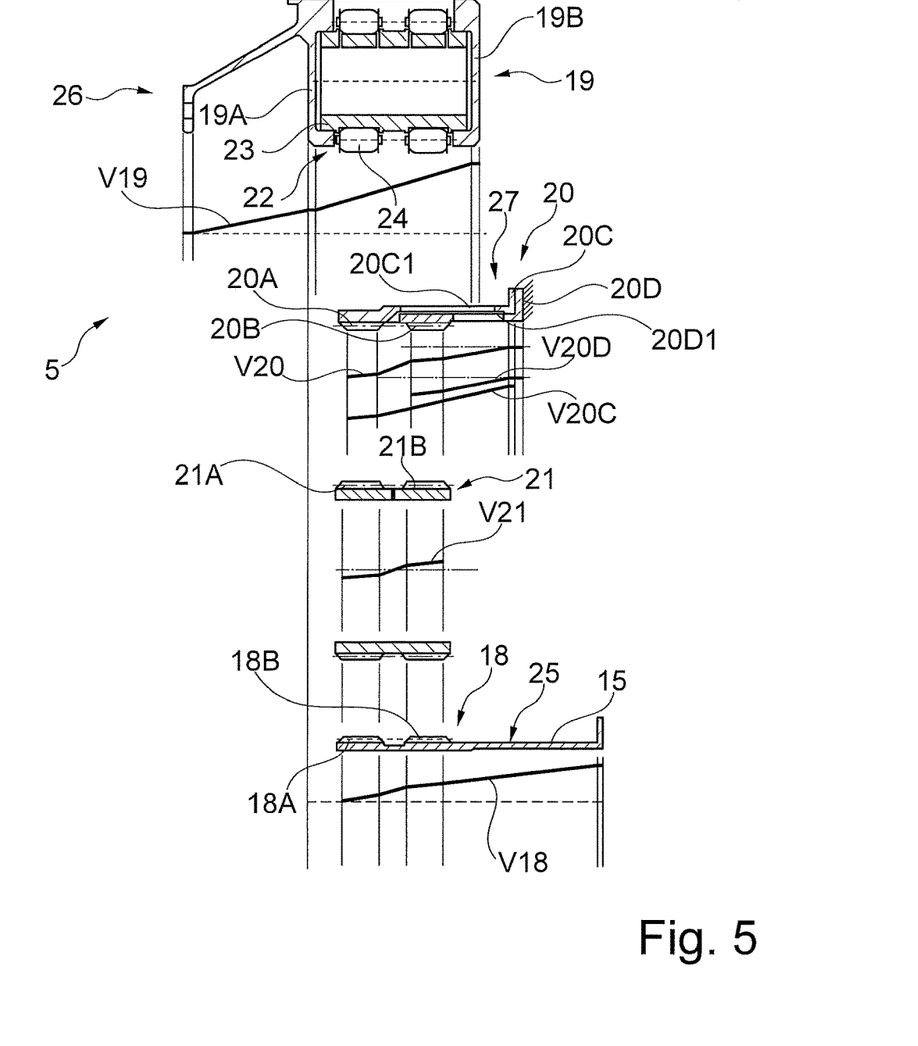
FIG. 5 shows a rendering of the planetary gear according to FIG. 4 corresponding to FIG. 2.

In this manner, it is again ensured that torsions in the area of the tooth meshings between the sun wheel 18 and the planetary wheel 21 as well as between the planetary wheel 21 and the hollow wheel 20 are so small that the contact surfaces between the respectively meshing tooth flanks of these tooth meshings have dimensions that prevent inadmissibly high Hertzian stresses.

Moreover, there is also the possibility of realizing planetary gears in the previously described manner in such a way that the hollow wheel, the sun wheel and also the planetary carrier are embodied in a rotatable manner.

PARTS LIST

1 turbomachine; jet engine
2 rotational axis
3 air intake
4 fan
5 planetary gear device
6 low-pressure compressor
7 high-pressure compressor
8 combustion device
9 high-pressure turbine
10 low-pressure turbine
11 discharge nozzle
12 engine nacelle
13 bypass channel
14 high-pressure shaft
15 low-pressure shaft
16 fan shaft
18 sun wheel
18A, 18B tooth area of the sun wheel
19 planetary carrier
19A, 19B planetary carrier area
20 hollow wheel
20A, 20B tooth area of the hollow wheel
20C, 20D hollow wheel part
20C1, 20D1 area
21 planetary wheel
21A, 21B tooth area of the planetary wheel 21
22 roller bearing
23 inner bearing ring
24 roller body
25 connection area of the sun wheel 18
26 connection area of the planetary carrier 19
27 connection area of the hollow wheel 20
28 housing of the jet engine 1
A axial direction

The invention claimed is:

1. A planetary gear arrangement, comprising:
a sun wheel,
a hollow wheel,
a planetary carrier,
a planetary wheel mounted on the planetary carrier in a rotatable manner and being in mesh with the hollow wheel and the sun wheel,
wherein, on a first side of the planetary carrier in an axial direction with respect to the planetary carrier, the sun wheel and the hollow wheel respectively include connection areas for coupling the sun wheel and the hollow wheel to rotatable or fixed areas of a jet engine, while the planetary carrier includes a connection area for attaching the planetary carrier to rotatable or fixed areas of the jet engine on an opposite second side of the planetary carrier,
wherein the sun wheel, the hollow wheel and the planetary wheel each respectively include toothed areas extending along the axial direction between first and second axial positions and engaging with one another,
wherein structural component stiffnesses of the sun wheel, the planetary carrier, the hollow wheel and the planetary wheel are set with respect to each other such that during operation within an operational range of the jet engine, the sun wheel, the planetary carrier, the hollow wheel and the planetary wheel will each be caused to twist along the axial direction between the connection areas and side areas that face away from the connection areas due to torques respectively applied during the operation, starting from one of the first side and the second side of the planetary carrier in a direction of the other of the first side and the second side of the planetary carrier, with a progression of the twist of each of the sun wheel, the planetary carrier, the hollow wheel and the planetary wheel across the axial direction of the planetary gear arrangement being in a same circumferential direction during operation to maintain a uniform engagement of the toothed areas from the first axial position to the second axial position;

an entirety of a fixation between the planetary gear arrangement and the fixed area of the jet engine being positioned on an opposite side of the planetary gear arrangement from an output of the planetary gear arrangement;

a connection between an input to the planetary gear arrangement and the planetary gear arrangement being positioned on an opposite axial side of the planetary gear arrangement as a connection between the output of the planetary gear arrangement and the planetary gear arrangement to maintain the progression of the twist of each of the sun wheel, the planetary carrier, the hollow wheel and the planetary wheel across the axial direction of the planetary gear arrangement in the same circumferential direction during operation;

wherein a driving input force to the planetary gear arrangement is positioned asymmetrically on the sun wheel, offset with respect to an axial center of the sun wheel, to be positioned on only one axial side of the sun wheel, such that the sun wheel has a input axial side and an opposite non-input axial side, thereby causing the progression of twist between the input axial side and the opposite non-input axial side;

wherein a driving output force from the planetary gear arrangement, from at least one chosen from the hollow wheel and the planetary carrier, is positioned asymmetrically on the at least one chosen from the hollow wheel and the planetary carrier, offset with respect to an axial center of the at least one chosen from the hollow wheel and the planetary carrier, to be positioned on only one axial side of the at least one chosen from the hollow wheel and the planetary carrier, such that the at least one chosen from the hollow wheel and the planetary carrier has an output axial side and an opposite non-output axial side, thereby causing the progression of twist between the output axial side and the opposite non-output axial side.

2. The planetary gear arrangement according to claim 1, wherein the sun wheel, the hollow wheel and the planetary wheel each respectively include two teeth areas that are arranged at a distance from each other in the axial direction, and have at least two areas between the two teeth areas that are arranged at a distance from each other in a circumferential direction with respect to the planetary carrier, with wall thicknesses of the at least two areas respectively differing from wall thicknesses of circumferential areas that are arranged in between the at least two areas.

3. The planetary gear arrangement according to claim 2, wherein the two teeth areas of the sun wheel, the hollow wheel and the planetary wheel respectively include helical gearings.

4. The planetary gear arrangement according to claim 3, wherein helix angles of the helical gearings of the two teeth areas of the sun wheel, the hollow wheel and the planetary wheel are identical.

5. The planetary gear arrangement according to claim 3, wherein helix angles of the helical gearings of the two teeth areas of at least two chosen from the sun wheel, the hollow wheel and the planetary wheel differ from each other.

6. The planetary gear arrangement according to claim 3, wherein helix angles of the helical gearings of the two teeth areas of the sun wheel, the hollow wheel and the planetary wheel are respectively increased by a defined offset value in rotational directions of the sun wheel, the hollow wheel and the planetary wheel for compensating for the twisting of the planetary carrier in a circumferential direction with respect to the planetary carrier.

7. The planetary gear arrangement according to claim 1, wherein the connection areas of at least one chosen from the sun wheel, the hollow wheel and the planetary carrier have at least two areas that are arranged at a distance from each other in a circumferential direction with respect to the planetary carrier, with wall thicknesses of the at least two areas differing from circumferential areas that are respectively located in between the at least two areas.

8. The planetary gear arrangement according to claim 1, wherein teeth of the sun wheel, of the hollow wheel and of the planetary wheel are crowned teeth.

9. The planetary gear arrangement according to claim 2, wherein the hollow wheel includes two parts, wherein each of the two parts comprises one of the two teeth areas, and the structural component stiffnesses of the hollow wheel parts are set such that, during operation within the defined operational range, twistings of the two parts in a circumferential direction with respect to the planetary carrier respectively cause a defined oblique position of teeth of the two teeth areas.

10. The planetary gear arrangement according to claim 1, wherein a twisting, which is oriented counter to the twisting of the planetary carrier as occurs during the operation within the operational range, is applied to the unloaded planetary carrier in the axial direction through the mounted planetary wheel.

11. The planetary gear arrangement according to claim 1, wherein the input to the planetary gear arrangement is positioned on an opposite axial side of the planetary gear arrangement with respect to a connection between the input and the planetary gear arrangement.

12. The planetary gear arrangement according to claim 11, wherein the output from the planetary gear arrangement is positioned on an opposite axial side of the planetary gear arrangement with respect to a connection between the output and the planetary gear arrangement.

13. The planetary gear arrangement according to claim 1, wherein the output from the planetary gear arrangement is positioned on an opposite axial side of the planetary gear arrangement with respect to a connection between the output and the planetary gear arrangement.

14. The planetary gear arrangement according to claim 1, wherein the input to the planetary gear arrangement is positioned on an opposite axial side of the planetary gear arrangement with respect to a connection between the input and the sun wheel.

15. The planetary gear arrangement according to claim 14, wherein the output from the planetary gear arrangement is positioned on an opposite axial side of the planetary gear arrangement with respect to a connection between the output and the hollow wheel.

16. The planetary gear arrangement according to claim 1, wherein the output from the planetary gear arrangement is positioned on an opposite axial side of the planetary gear arrangement with respect to a connection between the output and the hollow wheel.

17. The planetary gear arrangement according to claim 1, wherein certain circumferential areas of the hollow wheel have wall thicknesses that differ from other circumferential areas of the hollow wheel to adjust torsional stiffness of the hollow wheel, wherein the certain circumferential areas are configured as through recesses.

18. The planetary gear arrangement according to claim 1, wherein certain circumferential areas of the hollow wheel have wall thicknesses that differ from other circumferential areas of the hollow wheel to adjust torsional stiffness of the hollow wheel, wherein the certain circumferential areas are configured as strengthening ribs and have thicker thicknesses than the other circumferential areas.

19. A planetary gear arrangement, comprising:
a sun wheel,
a hollow wheel,
a planetary carrier,
a planetary wheel mounted on the planetary carrier in a rotatable manner and being in mesh with the hollow wheel and the sun wheel,
wherein, on a first side of the planetary carrier in an axial direction with respect to the planetary carrier, the sun wheel and the hollow wheel respectively include connection areas for coupling the sun wheel and the hollow wheel to rotatable or fixed areas of a jet engine, while the planetary carrier includes a connection area for attaching the planetary carrier to rotatable or fixed areas of the jet engine on an opposite second side of the planetary carrier,
wherein the sun wheel, the hollow wheel and the planetary wheel each respectively include toothed areas extending along the axial direction between first and second axial positions and engaging with one another,
wherein structural component stiffnesses of the sun wheel, the planetary carrier, the hollow wheel and the planetary wheel are set with respect to each other such that during operation within an operational range of the jet engine, the sun wheel, the planetary carrier, the hollow wheel and the planetary wheel will each be caused to twist along the axial direction between the connection areas and side areas that face away from the connection areas due to torques respectively applied during the operation, starting from one of the first side and the second side of the planetary carrier in a direction of the other of the first side and the second side of the planetary carrier, with a progression of the twist of each of the sun wheel, the planetary carrier, the hollow wheel and the planetary wheel across the axial direction of the planetary gear arrangement being in a same circumferential direction during operation to maintain a uniform engagement of the toothed areas from the first axial position to the second axial position;
an entirety of a fixation between the planetary gear arrangement and the fixed area of the jet engine being positioned on an opposite side of the planetary gear arrangement from an output of the planetary gear arrangement;
wherein a driving input force to the planetary gear arrangement is positioned asymmetrically on the sun wheel, offset with respect to an axial center of the sun wheel, to be positioned on only one axial side of the sun wheel, such that the sun wheel has a input axial side and an opposite non-input axial side, thereby causing the progression of twist between the input axial side and the opposite non-input axial side;
wherein a driving output force from the planetary gear arrangement, from at least one chosen from the hollow wheel and the planetary carrier, is positioned asymmetrically on the at least one chosen from the hollow wheel and the planetary carrier, offset with respect to an axial center of the at least one chosen from the hollow wheel and the planetary carrier, to be positioned on only one axial side of the at least one chosen from the hollow wheel and the planetary carrier, such that the at least one chosen from the hollow wheel and the planetary carrier has an output axial side and an opposite non-output axial side, thereby causing the progression of twist between the output axial side and the opposite non-output axial side;
wherein the input axial side is positioned on an opposite axial side of the planetary gear arrangement than the output axial side, to maintain the progression of the twist of each of the sun wheel, the planetary carrier, the hollow wheel and the planetary wheel across the axial direction of the planetary gear arrangement in the same circumferential direction during operation.

* * * * *